(12) United States Patent
Brookner

(10) Patent No.: US 7,512,939 B2
(45) Date of Patent: Mar. 31, 2009

(54) SYSTEM AND METHOD OF SECURE UPDATING OF REMOTE DEVICE SOFTWARE

(75) Inventor: George M. Brookner, Norwalk, CT (US)

(73) Assignee: Neopost Technologies, Bagneux (FR)

( * ) Notice: Subject to any disclaimer, the term of this patent is extended or adjusted under 35 U.S.C. 154(b) by 846 days.

(21) Appl. No.: 11/047,285

(22) Filed: Jan. 31, 2005

(65) Prior Publication Data

US 2006/0075077 A1 Apr. 6, 2006

Related U.S. Application Data

(60) Provisional application No. 60/616,180, filed on Oct. 5, 2004.

(51) Int. Cl.
*G06F 9/45* (2006.01)
(52) U.S. Cl. ...................................................... 717/170
(58) Field of Classification Search ................ 717/170; 705/40, 50, 60, 401, 408
See application file for complete search history.

(56) References Cited

U.S. PATENT DOCUMENTS

| 5,418,837 | A | | 5/1995 | Johansson et al. | |
|---|---|---|---|---|---|
| 5,699,257 | A | * | 12/1997 | Emmett et al. | 705/408 |
| 5,797,016 | A | | 8/1998 | Chen et al. | |
| 5,838,981 | A | | 11/1998 | Gotoh | |
| 6,457,175 | B1 | | 9/2002 | Lerche | |
| 6,502,240 | B1 | * | 12/2002 | Naclerio | 717/170 |
| 6,681,389 | B1 | | 1/2004 | Engel et al. | |
| 6,957,196 | B1 | * | 10/2005 | Cordery et al. | 705/60 |
| 7,236,956 | B1 | * | 6/2007 | Ogg et al. | 705/50 |
| 2002/0083020 | A1 | * | 6/2002 | Leon | 705/401 |
| 2002/0087668 | A1 | | 7/2002 | San Martin et al. | |
| 2003/0009752 | A1 | | 1/2003 | Gupta | |
| 2003/0074324 | A1 | | 4/2003 | Kresina et al. | |
| 2004/0073799 | A1 | | 4/2004 | Hitz et al. | |
| 2004/0098715 | A1 | | 5/2004 | Aghera et al. | |
| 2004/0105548 | A1 | * | 6/2004 | Fujiwara et al. | 380/277 |
| 2004/0193998 | A1 | | 9/2004 | Blackburn et al. | |
| 2005/0257205 | A1 | * | 11/2005 | Costea et al. | 717/168 |
| 2005/0278266 | A1 | * | 12/2005 | Ogg et al. | 705/408 |
| 2006/0041505 | A1 | * | 2/2006 | Enyart | 705/40 |
| 2006/0112183 | A1 | * | 5/2006 | Corson et al. | 709/230 |
| 2007/0198441 | A1 | * | 8/2007 | Kara | 705/408 |

FOREIGN PATENT DOCUMENTS

| EP | 1 271 311 A2 | 1/2003 |
|---|---|---|
| WO | WO 98 19247 | 5/1998 |
| WO | WO 98/54642 A1 | 12/1998 |
| WO | 03/010663 A | 2/2003 |
| WO | 2004/063899 A | 7/2004 |

OTHER PUBLICATIONS

International Search Report for GB0520056.3 application.
International Search Report for FR05/10162 application.

* cited by examiner

*Primary Examiner*—John Chavis
(74) *Attorney, Agent, or Firm*—Townsend and Townsend and Crew LLP

(57) ABSTRACT

A method of securely updating software in a remote device includes copying selected portions of program code in the remote device to a memory, downloading software to the remote device, and upon detecting an unsuccessful download, reinstalling the selected portions of program code.

8 Claims, 2 Drawing Sheets

SYSTEM AND METHOD OF SECURE UPDATING OF REMOTE DEVICE SOFTWARE

This application claims the benefit of U.S. Provisional Application No. 60/616,180 filed Oct. 5, 2004, which is incorporated by reference herein in its entirety.

BACKGROUND OF THE INVENTION

The disclosed embodiments are related to securely updating software in a remote device.

Brief Description of Related Developments

Historically, it has been a concern of providers of software controlled remote devices on how to cost-effectively address those devices that are deemed to have software with errors or software that required updating to advance said devices' operation or performance. With devices in the field, the cost could be prohibitive to recall and reprogram and return devices to the customer, let alone the customer being without the device for a period of time, so the device remained unchanged. In more current devices, the ability to download software into said device is a popular mechanism to provide the customer with the most current version of software for the device of concern. One of the characteristics of such a system is the need to assure that the device is updated securely and properly, otherwise the device being updated would not function properly, requiring administrative procedures to correct the attempted update.

SUMMARY OF THE EXEMPLARY EMBODIMENTS

The present invention is directed to a system and method of updating device software via a remote service center. The service center, upon being contacted by a device proceeds to examine the device's software to determine whether an update is required due to a revision having been made to the design or a bug having been found and corrected.

In one exemplary embodiment, a method of securely updating the software in the remote device includes copying selected portions of program code in the remote device to a memory, downloading software to the remote device, and upon detecting an unsuccessful download, reinstalling the selected portions of program code.

According to an exemplary embodiment, a system for securely updating software in a remote device is provided. The system includes a server and a remote device. The remote device is connected to the server through a network, the remote device being adapted to copy selected portions of program code in the remote device to a memory. The server is adapted to download software to the remote device and the remote device is adapted to, upon detection of an unsuccessful download, reinstall the selected portions of program code.

According to one exemplary embodiment, a postage meter is provided. The postage meter includes a microprocessor and a communications port. The postage meter is adapted copy selected portions of program code in the remote device to the memory before downloading software updates and reinstall the selected portions of program code, upon detecting an unsuccessful download.

According to another exemplary embodiment, a server for securely updating software in a remote device is provided. The server includes a processor and a memory. The server is adapted to automatically identify whether the remote device is a candidate for a software update.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
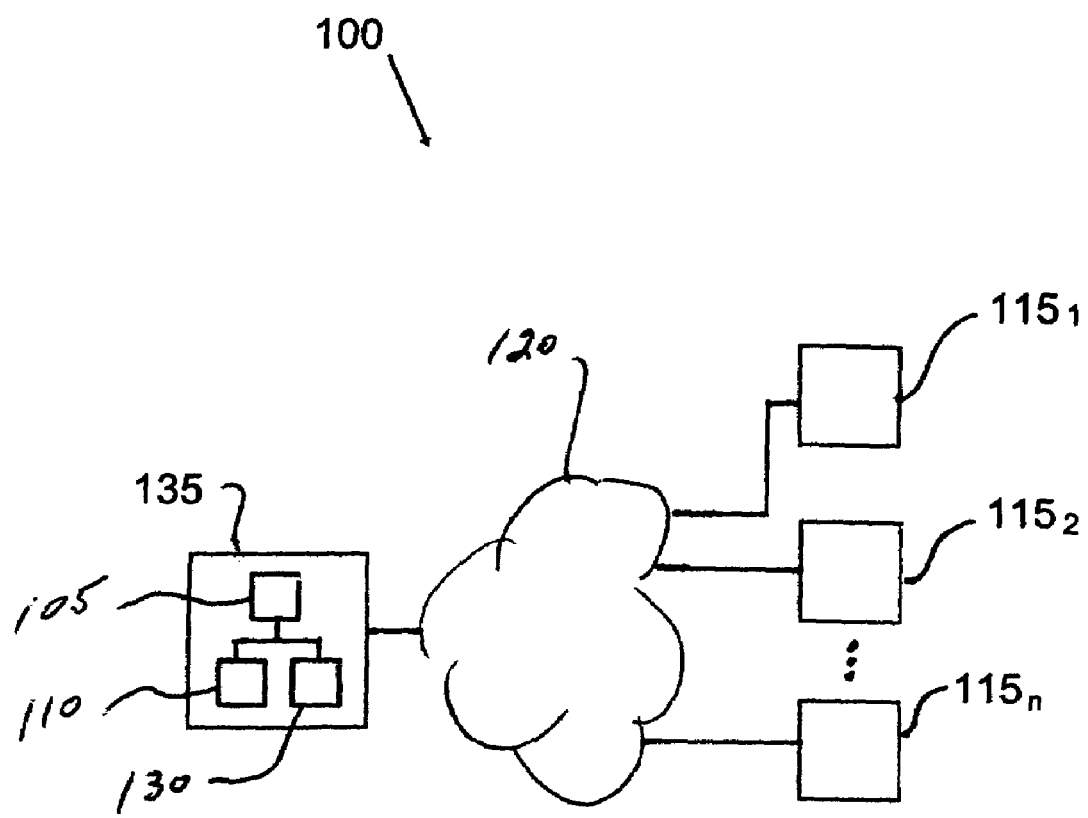
FIG. 1 shows a block diagram of a system suitable for practicing the invention.

FIG. 1 shows a block diagram of a system suitable for practicing the invention disclosed herein. Although the present invention will be described with reference to the embodiment shown in the drawings, it should be understood that the present invention can be embodied in many alternate forms of embodiments. In addition, any suitable size, shape or type of elements or materials could be used.

System 100 is a system for providing services, for example, a postal services provider system. System 100 includes one or more remote devices, for example, indicia producing or marking devices, shown in FIG. 1 as meters $115_1 \ldots 115_n$, and a remote data center, shown generally as a server 135.

It is a feature of the present invention for the server to provide the remote devices with software updates.

In one embodiment, server 135 may connect to meters $115_1 \ldots 115_n$ wirelessly. In another embodiment, the connection may be a wired connection.

Server 135 generally includes a processor 105, a memory 110, and a database 130 for storing information. Processor 105 generally operates under the control of programs stored in memory 110 to manage operations of server 135. Server 135 generally provides updates, programs that allow additional functionality, replacement programs, data tables and other data and information to remote devices $115_1 \ldots 115_n$. In addition, server 135 may collect data from remote devices $115_1 \ldots 115_n$ and provide reporting and accounting services.

Server 135 may be coupled to a data communications network 120. Data communications network 120 may include any suitable communications network, for example, the Public Switched Telephone Network (PSTN), a wireless network, a wired network, a Local Area Network (LAN), a Wide Area Network (WAN), virtual private network (VPN) etc. Server 135 may communicate with meters $115_1 \ldots 115_n$ using any suitable protocol, or modulation standard, for example, X.25, ATM, TCP/IP, V34, V90, etc. When data communications network 120 is implemented as a wireless network, it generally incorporates an air interface utilizing any suitable wireless communication protocol or signaling techniques or standards, for example TDMA, CDMA, IEEE 802.11, Bluetooth, close range RF, optical, any appropriate satellite communication standards, etc.

Figure 2:
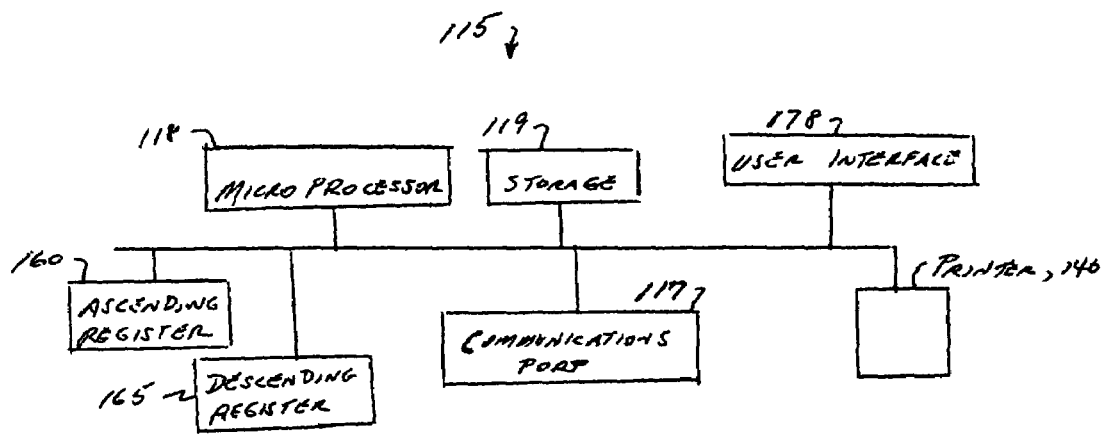
FIG. 2 shows a remote device suitable for operating within the system of FIG. 1.

FIG. 2 shows a general block diagram of a remote device 115. Remote devices $115_1 \ldots 115_n$ generally provide services to one or more customers. In one embodiment, the remote devices may provide indicia that has value, for example, postage, tickets allowing admission to an event or allowing the use of a service, etc. Remote device 115 may include a communications port 117 and a microprocessor 118 for performing accounting, control, and handling functions according to programs stored in a storage device 119. Some of these functions or subsets of these functions may be grouped within a secure perimeter as what is commonly referred to as a Postal Security Device (PSD).

Storage device 119 generally stores machine readable program code which is adapted to cause microprocessor 118 to perform functions associated with producing indicia. Storage device 119 may utilize optical, magnetic, semiconductor, electronic, or other types of suitable devices to store the program code.

Presently, there is no inexpensive system and method to provide a secured and guaranteed method or system for updating remote device software remotely. The disclosed embodiments provide the ability to securely return the remote device to its condition prior to a failed updating attempt and attempt to minimize the overhead required by any administrative processes.

The exemplary embodiments include a method and system that provides automatic identification of a remote device needing a software update. Advantageously, the system includes a remote data center, or server 135, for example a Neopost postage meter resetting system that is in communication with postage metering devices at customer sites.

According to the exemplary embodiments, a customer device 115 periodically contacts the server 135 to report its status, request a postage funds update, order material, or the like. At the time of contact, the server 135 evaluates its database to see if the device 115 is a candidate for a software update.

The server initiates a secure communication session with the device 115 during which updated software is downloaded to the device 115. The software within the device 115 is cryptographically signed by the server 135 such that the associated software is specifically identified by the device 115. Such a mechanism includes embedding the device's identity (e.g. serial number) into the signatory process. The receiving device 115, uses the public key of the server 135 to relate its own serial number to that within the software download (typically a message header parameter), and operates a process to accept the download as valid or reject the download. In one embodiment, the download may be made up of multiple pieces or segments, where each piece or segment is uniquely signed by the server 135 and may be downloaded singularly or sequentially. The remote device 115 may have a boot loader capable of accepting the software being downloaded and populating the device memories accordingly.

To guarantee return to operability should an event occur that interrupts, damages, or otherwise renders the software download incomplete, the remote device generally makes image backups of its memory contents (e.g. EPROM, battery backed up RAM, FLASH, or other memory contents of the device) prior to commencing a download process. The device upon detecting a failed, incomplete or otherwise unsuccessful software download, may reinstall the image contents of each of its memory contents. The memory contents will be both the operation/applications software and data. The image backup may be saved uncompressed or compressed, depending upon the amount of memory reserved for said transaction.

In a preferred embodiment, in order to guarantee security of any software downloading transaction, and to assure the new software has not been tampered with, in addition to the digital signing process, the device 115 will compute a Hash of its software and sign it with its private encryption key. The device 115 may also provide the server 135 with the Hash, and the server may then validate the Hash using the public key of the device 115 which may be retained by the server 135. In addition to validating the device 115, the server 135 may also determine the version level of the device software (i.e., the host retain a Hash of its software versions).

For the device to be sure that the downloaded software is, in fact from the server 135 and not somehow compromised, the server 135 as part of the new software download, will return a signed version of the Hash sent by the device 115 to the server 135. Since the server 135 has used its private key to sign the hash, only the device 115 with an associated public key of the server 135 can validate the hash and compare the returned has the originally sent hash. Should the two Hash values equate, the downloaded software is from the associated server 135.

Once the new software is downloaded successfully, as determined by the messaging complete processing, the server 135 will validate that, in fact, the device 115 is properly functioning with the new software by requesting the device 115 to run an appropriate diagnostic to acquire system performance/diagnostic parameters for transmission to the server 135. Should said performance/diagnostic parameters prove to be acceptable, the server 135 will instruct the device 115 to place the new software into operation and remove the backed up image contents. Should the server 135 determine that the performance/diagnostic parameters are not consistent with those desired, the server may request the device 115 to replace said new software with its backed up memory image contents and return to operating with the device's original software. In this case, a retry of the software download may be in order, or service support may be necessary, or the device will be maintained at its original software version level.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of updating software stored in a remote postage meter, the method comprising:

computing a hash of initial software stored in the remote postage meter;

cryptographically signing the hash with a private key of the remote postage meter;

providing the signed hash to a server;

receiving cryptographically-signed data from the server, the data comprising a software update and the hash, using a public key of the server, decrypting the cryptographically-signed data;

verifying the source of the software update by confirming that the hash included in the cryptographically-signed data matches the computed hash of the initial software;

verifying the validity of the software update by confirming that a serial number of the remote postage meter matches a serial number embedded within the software update; and installing the software update in the remote postage meter.

2. The method of claim 1, comprising:

at the server, decrypting the signed hash with a public key corresponding to the private key of the remote postage meter.

3. The method of claim 1, comprising:

prior to receiving the cryptographically-signed data, storing a backup copy of the initial software at the remote postage meter;

subsequent to installing the software update, running a diagnostic test to acquire performance parameters of the remote postage meter; and sending the performance parameters to the server.

4. The method of claim 3, comprising receiving instructions from the server to retain the software update.

5. The method of claim 3, comprising:
receiving instructions from the server to replace the updated software with the backup copy of the initial software;
discarding the updated software; and
restoring the backup copy of the initial software to the remote postage meter.

6. The method of claim 3, comprising:
receiving instructions from the server to download at least a portion of the cryptographically-signed data; and
downloading the at least a portion of the cryptographically signed data.

7. The method of claim 1, wherein the server is a postage meter resetting server.

8. A method of updating software stored in a remote postage meter, the method comprising:
computing a hash of initial software stored in the remote postage meter;
storing a backup copy of the initial software at the remote postage meter;
cryptographically signing the hash with a private key of the remote postage meter;
providing the signed hash to a postage meter resetting system;
at the postage meter resetting system, decrypting the signed hash with a public key corresponding to the private key of the remote postage meter;
receiving cryptographically-signed data from the postage meter resetting system, the data comprising a software update and the hash;
using a public key of the postage meter resetting system, decrypting the cryptographically-signed data;
verifying the source of the software update by confirming that the hash included in the cryptographically-signed data matches the computed hash of the initial software;
verifying the validity of the software update by confirming that a serial number of the remote postage meter matches a serial number embedded within the software update;
installing the software update in the remote postage meter;
running a diagnostic test to acquire performance parameters of the remote postage meter;
sending the performance parameters to the postage meter resetting system;
receiving instructions regarding the software update, the instructions based on the performance parameters; and
based on the instructions performing at least one of retaining, discarding, and re-downloading the software update from the sever.

\* \* \* \* \*